(12) United States Patent
Oohira (10) Patent No.: US 7,760,287 B2
(45) Date of Patent: Jul. 20, 2010

(54) LIQUID CRYSTAL DISPLAY DEVICE WITH REVISED MOLD CORNER

(75) Inventor: Eiji Oohira, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 219 days.

(21) Appl. No.: 12/071,343

(22) Filed: Feb. 20, 2008

(65) Prior Publication Data

US 2008/0198289 A1 Aug. 21, 2008

(30) Foreign Application Priority Data

Feb. 20, 2007 (JP) ............... 2007-039313

(51) Int. Cl.
*G02F 1/1335* (2006.01)

(52) U.S. Cl. ........................ 349/58; 349/150

(58) Field of Classification Search .................... 349/58
See application file for complete search history.

(56) References Cited

U.S. PATENT DOCUMENTS 6,583,843 B2 6/2003 Ishino 7,477,338 B2 1/2009 Aramatsu
7,570,316 B2 * 8/2009 Kim ........................... 349/58

FOREIGN PATENT DOCUMENTS

JP 2005-338497 5/2004

* cited by examiner

*Primary Examiner*—Richard H Kim
(74) *Attorney, Agent, or Firm*—Stites & Harbison PLLC; Juan Carlos A. Marquez, Esq.

(57) ABSTRACT

In the invention, a liquid crystal display device having a configuration for preventing breakage of a liquid crystal display panel when outer dimensions and thickness of a liquid crystal display device for cellular phones are reduced is disclosed. In the configuration of the invention, a liquid crystal display panel including a TFT substrate and a color filter substrate is mounted within a mold. In the part where a liquid crystal is sealed, the TFT substrate and the color filter substrate are laminated. However, a part of the TFT substrate only is mechanically weak against an external force from the backside of the mold. By forming holes in corners of the mold corresponding to the location of the TFT substrate only, deformation of the mold due to the external force from the backside of the mold does not affect the TFT substrate. Thereby, breakage of the TFT substrate can be prevented.

12 Claims, 7 Drawing Sheets

LIQUID CRYSTAL DISPLAY DEVICE WITH REVISED MOLD CORNER

CROSS-REFERENCE TO RELATED APPLICATIONS

The disclosure of Japanese Patent Application No. 2007-39313 filed on Feb. 20, 2007 including the specification, drawings and abstract is incorporated herein by reference in its entirety.

BACKGROUND

1. Field of the Invention

The present invention relates to a liquid crystal display device, and specifically, a technique of reducing the outer dimensions and thickness of a set of a small display device for a cellular phone or the like.

2. Description of Related Arts

For a liquid crystal display device, there is a strong demand to reduce the outer dimensions of the set and reduce the thickness of the set while keeping a certain screen size. This demand is especially strong for a display device such as a liquid crystal display device for cellular phone or the like, which requires the smaller outer dimensions and thickness of the set.

Figure 11:
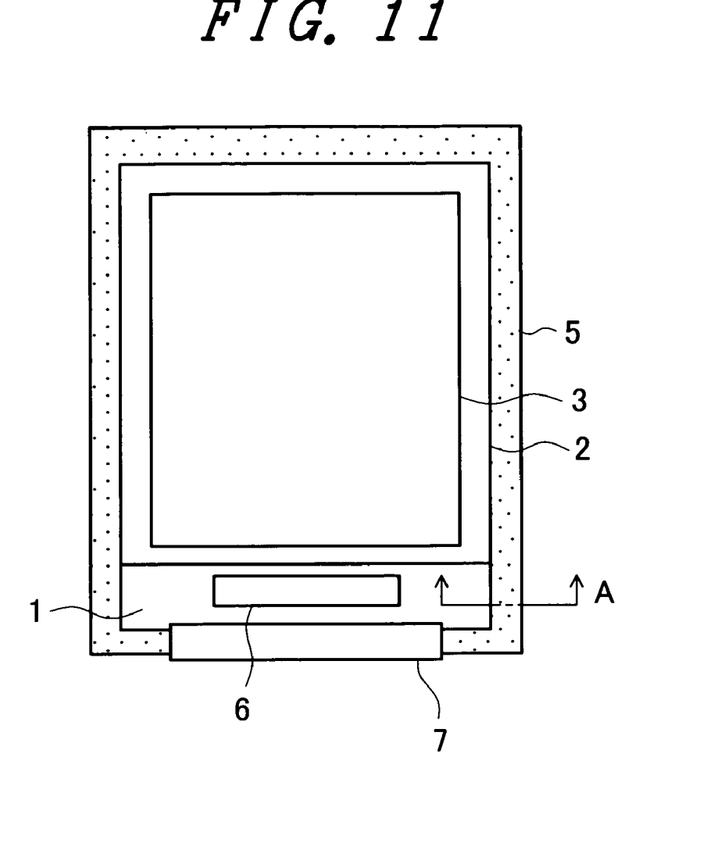
FIG. 11 is a plan view showing a conventional example of a liquid crystal display device.

FIG. 11 is an example of a plan view of a module of a small liquid crystal display device used for a cellular phone. In FIG. 11, a liquid crystal display panel includes a TFT substrate 1 on which pixel electrodes, thin-film-transistors (TFTs), data signal lines, scan lines, etc. are formed, a color filter substrate 2 on which a color filter etc. are formed, an upper polarizer 3 attached onto the color filter substrate 2, and a lower polarizer (not shown) attached to the undersurface of the TFT substrate 1. The parts where the polarizers are attached are nearly equal to the available picture area on which images are formed. The TFT substrate 1, the color filter substrate 2, the upper polarizer 3, and the lower polarizer 4 form the liquid crystal display panel.

The TFT substrate 1 is formed larger than the color filter substrate 2 so that an IC driver 6 for driving the liquid crystal display panel, a flexible wiring board 7 for supplying power and signals to the liquid crystal display panel, etc. may be mounted thereon. The liquid crystal display panel is held in a mold 5 formed of a resin or the like.

A backlight is provided on the backside of the liquid crystal display panel for applying light from the backside to the liquid crystal display panel. The backlight is held in the mold at the backside of the liquid crystal display panel. The flexible wiring board 7 mounted on the TFT substrate 1 is folded back to the backside of the resin mold 5 while covering the short sides of the resin mold 5. This is for reducing the outer size of the liquid crystal display device. The liquid crystal display panel, the resin mold 5 holding the backlight etc., the flexible wiring board 7, and so on are typically housed within a frame (not shown) made of metal. When the flexible wiring board 7 is put into the frame, a stress is produced due to bending of the flexible wiring board 7, and various measures have been proposed for relaxing the stress. Japanese Patent Laid-open No. 2005-338497 is cited as an example of a configuration as a measure for the problem.

SUMMARY

The above described related art relates to a configuration principally for reducing the outer dimensions of the liquid crystal display device. In a liquid crystal display device for cellular phone or the like, a demand to reduce not only the outer dimensions but also the thickness of the display device is strong. Accordingly, the entire thickness of the device including the mold 5 with the liquid crystal display panel, the backlight, etc. incorporated therein is made as thin as about 1.6 mm.

For realization of such a thin liquid crystal display device, the thickness of the liquid crystal display panel itself must be made thin. Generally, the thickness of a glass substrate such as the TFT substrate 1 or the color filter substrate 2 is about 0.6 mm. In this case, the thickness becomes 1.2 mm for the glass substrates, and therefore, it is impossible to make the thickness of the entire display device 1.6 mm. On the other hand, using a thin glass substrate, various kinds of machining on the glass substrate becomes difficult in the manufacturing process of the liquid crystal display panel.

In order to realize such a thin liquid crystal display device, the liquid crystal display panel is formed, and then, the surfaces of the TFT substrate 1 and the color filter substrate 2 of the liquid crystal display panel are respectively ground to have thicknesses as small as 0.25 mm. By the grinding, the thickness of the glass substrates becomes totally about 0.5 mm, and the thickness of the entire liquid crystal display device can be made as thin as about 1.6 mm.

However, a problem of glass strength arises due to those thinner glass substrates. Since the thickness of the part where the TFT substrate 1 and the color filter substrate 2 are bonded is totally about 0.5 mm, the glass strength is not so problematic there. On the other hand, the thickness of the parts with the TFT substrate 1 only for mounting the IC driver 6, connection of the flexible wiring board 7, and so on remain 0.25 mm, and the glass strength in the parts is problematic. This is because the glass strength is proportional to the third power of the thickness.

The liquid crystal display panel is held in the mold 5 formed of a resin, and polycarbonate is generally used as the material of the mold 5. The polycarbonate is a material with great elasticity. Further, the mold 5 is formed thin for reducing the weight, reducing the outer dimensions, or reducing the thickness of the entire liquid crystal display device. Therefore, the mold has a structure that easily and elastically deforms when an external force is applied thereto.

Figure 12:
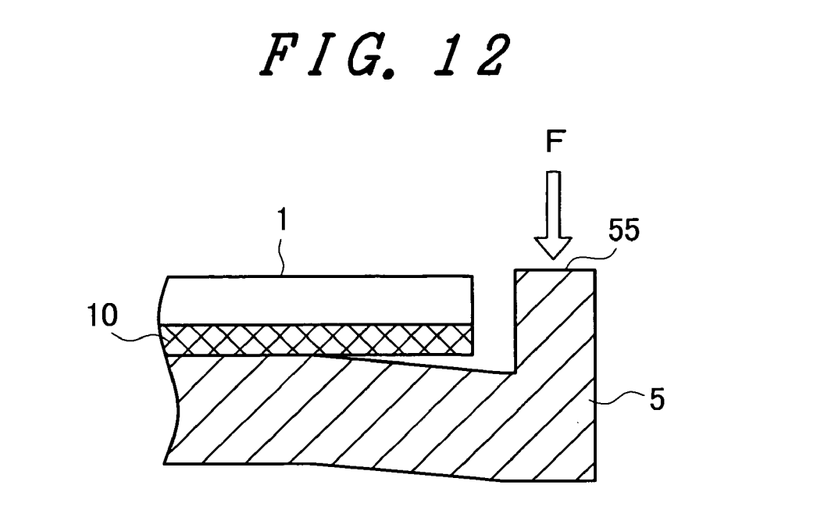
FIG. 12 is a sectional view when an external force is applied to the mold from above.

FIG. 12 shows a condition in a section along A-A of FIG. 11, when external force F is applied from above to an upper end 55 of the mold 5. Since the upper end 55 of the mold 5 is located above the TFT substrate 1, the external force tends to apply to the upper end 55 of the mold 5. When the external force F is applied, the mold 5 deforms but, in this case, the breakage of the TFT substrate 1 is not likely to occur because a light shielding double-faced tape 10 that joins the TFT substrate 1 and the mold 5 separates from the mold 5 and no stress is produced in the TFT substrate 1.

Figure 13:
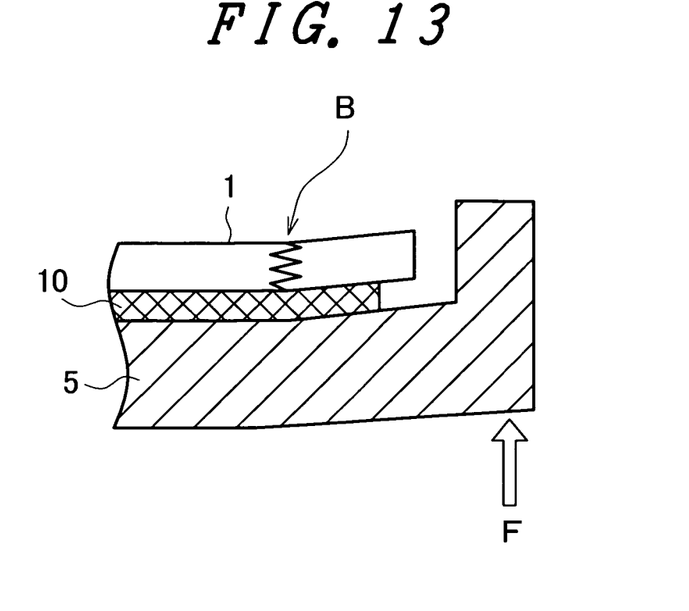
FIG. 13 is a sectional view when an external force is applied to the mold from below.

FIG. 13 shows a condition in a section along A-A of FIG. 11, when external force F is applied to a lower end of the mold 5. When the external force F is applied, the mold 5 deforms and, in this case, a stress is directly applied to the TFT substrate 1 through the light shielding double-faced tape 10 and the TFT substrate 1 is broken as indicated by B in FIG. 13.

Figure 14:
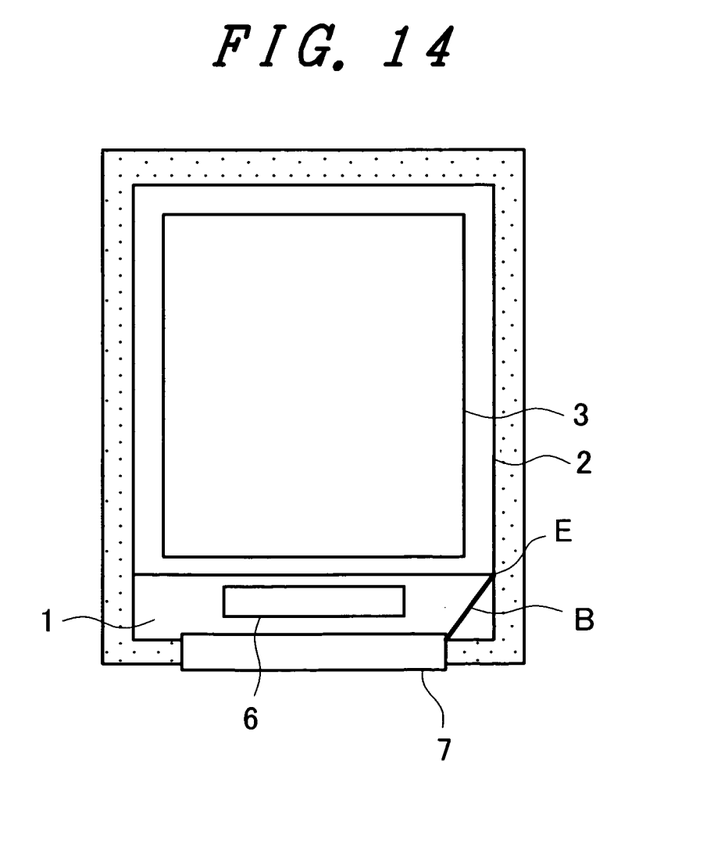
FIG. 14 is a plan view showing an example when a TFT substrate is broken.

FIG. 14 shows the breakage shown in FIG. 13 from the surface of the liquid crystal display device. In FIG. 14, the part indicated by B shows an example of the breakage of the TFT substrate 1. As shown in FIG. 14, the breakage line B often starts from the end E of the bonding of the TFT substrate 1 and the color filter substrate 2. This is because the stress tends to concentrate on the boundary portion E between the part where the TFT substrate 1 and the color filter substrate 2 are bonded and the part of the TFT substrate 1 only according to the principle of leverage.

As described above, a purpose of the invention is to address the breakage of the TFT substrate 1 when the liquid crystal display device is made thin.

The invention is to solve the above described problem by the following measures.

(1) A liquid crystal display device including: a liquid crystal display panel having a TFT substrate on which pixel electrodes and TFTs for controlling signals to the image electrodes are arranged in a matrix form and a liquid crystal display panel having a color filter substrate on which color filters corresponding to the pixel electrodes are formed; and a mold on which the liquid crystal display panel is mounted, wherein the liquid crystal display panel includes a part where the TFT substrate and the color filter substrate are laminated and a part of the TFT substrate only, and a hole is formed in a corner of the mold where the part of the TFT substrate only is mounted.

(2) The liquid crystal display device according to (1), wherein the hole formed in the mold corner is triangular.

(3) The liquid crystal display device according to (1), wherein the hole formed in the mold corner is triangular, and a length K of the triangle along a long side of the liquid crystal display panel satisfies $L/3 \leq K \leq L$, where a width along the long side of the liquid crystal display panel of the part of the TFT substrate only is L.

(4) The liquid crystal display device according to (1), wherein the TFT substrate is provided with a flexible wiring board, and when the TFT substrate is mounted on the mold, the hole formed in the mold corner does not overlap with the flexible wiring board.

(5) The liquid crystal display device according to (1), wherein the liquid crystal display panel is bonded to the mold with a light shielding double-faced tape, and the light shielding double-faced tape is not provided in the hole.

(6) The liquid crystal display device according to (1), wherein the TFT substrate is mounted within the mold, and a surface of the TFT substrate is located below an upper end of the mold.

(7) The liquid crystal display device according to (1), wherein a side opposite to the TFT substrate of the hole formed in the mold is covered by a reflecting sheet.

(8) A liquid crystal display device including: a liquid crystal display panel having a TFT substrate on which pixel electrodes and TFTs for controlling signals to the image electrodes are arranged in a matrix form and a liquid crystal display panel having a color filter substrate on which color filters corresponding to the pixel electrodes are formed; and a mold on which the liquid crystal display panel is mounted, wherein the liquid crystal display panel includes a part where the TFT substrate and the color filter substrate are laminated and a part of the TFT substrate only, and a recessed portion is formed in a corner of the mold where the part of the TFT substrate only is mounted.

(9) The liquid crystal display device according to (8), wherein the recessed portion formed in the mold corner is triangular.

(10) The liquid crystal display device according to (8), wherein the recessed portion formed in the mold corner is triangular, and a length K of the triangle along a long side of the liquid crystal display panel satisfies $L/3 \leq K \leq L$, where a width along the long side of the liquid crystal display panel of the part of the TFT substrate only is L.

(11) The liquid crystal display device according to (8), wherein the TFT substrate is provided with a flexible wiring board, and when the TFT substrate is mounted on the mold, the recessed portion formed in the mold corner does not overlap with the flexible wiring board.

(12) The liquid crystal display device according to (8), wherein the liquid crystal display panel is bonded to the mold with a light shielding double-faced tape, and the light shielding double-faced tape is not provided in the recessed portion.

(13) The liquid crystal display device according to (8), wherein the TFT substrate is mounted within the mold, and a surface of the TFT substrate is located below an upper end of the mold.

(14) The liquid crystal display device according to (8), wherein a depth of the recessed portion is 0.1 mm or more.

According to the measures (1) to (7), the hole is formed in the corner of the mold where the part of the TFT substrate only is mounted, and thus, when the mold elastically deforms due to application of the eternal force to the lower part of the mold, the deformation of the mold does not affect the TFT substrate and the breakage of the TFT substrate can be prevented. Therefore, the manufacture yield and reliability of products can be improved.

According to the measures (8) to (14), the recessed portion is formed in the corner of the mold where the part of the TFT substrate only is mounted, and thus, when the mold elastically deforms due to application of the eternal force to the lower part of the mold, the deformation of the mold does not affect the TFT substrate and the breakage of the TFT substrate can be prevented. Further, in the measures, since the recessed portion in the mold corner is not a through hole, the reduction in mechanical strength of the mold can be prevented. Therefore, the manufacture yield and reliability of products can be improved.

DETAILED DESCRIPTION OF THE INVENTION

The detailed description of the invention will be disclosed according to embodiments.

Embodiments

Figure 1:
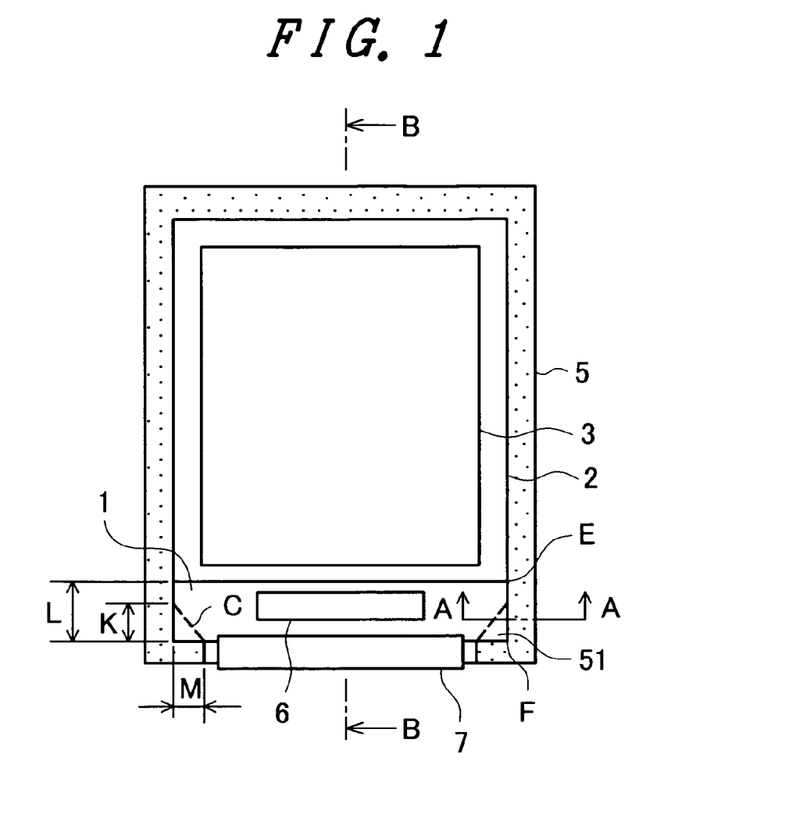
FIG. 1 is a plan view of embodiment 1.
Figure 2:
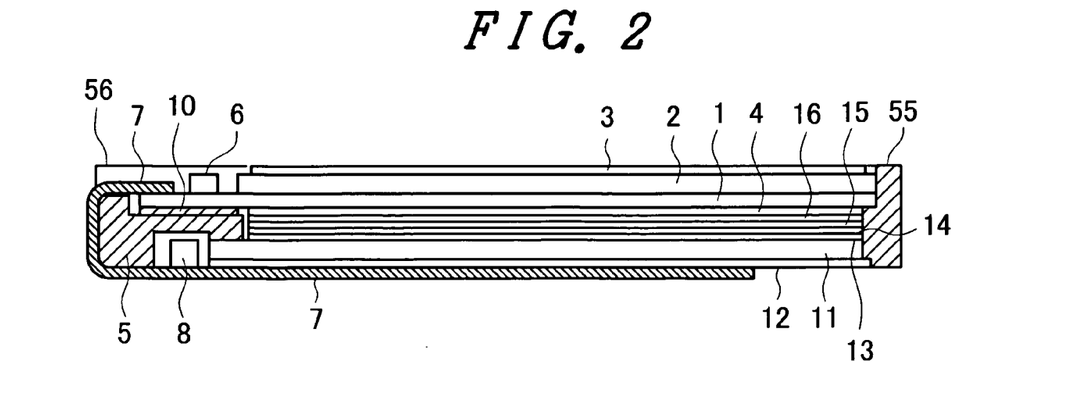
FIG. 2 is a sectional view along B-B of FIG. 1.

FIG. 1 is a plan view showing the first embodiment of the invention, and FIG. 2 is a sectional view along B-B of FIG. 1.

The plan view shown in FIG. 1 is nearly the same as that of the example of the related art. That is, in FIG. 1, a color filter substrate 2 of a liquid crystal display panel is provided on a TFT substrate 1. An upper polarizer 3 is attached onto the color filter substrate 2. The upper polarizer 3 corresponds approximately to the available picture area of the liquid crystal display panel. The color filter substrate 2, the TFT substrate 1, the upper polarizer 3, and a lower polarizer 4 attached to the undersurface of the TFT substrate 1 form the liquid crystal display panel.

The TFT substrate 1 is formed larger than the color filter substrate 2 so that an IC driver 6 for driving the liquid crystal display panel, a flexible wiring board 7 for supplying power and image signals to the liquid crystal display panel, etc. may be attached. The flexible wiring board 7 is folded back to the backside of the liquid crystal display panel for saving space.

The dimension L shown in FIG. 1 is a width of a part where the TFT substrate 1 is not attached to the color filter substrate 2. That is, the dimension is a width of the part having a thickness of 0.25 mm. The part shown by the dotted line C in FIG. 1 shows an end of a hole portion 51 formed in the corner of a mold 5, which will be described later. That is, the shape of the hole portion 51 in this case is triangular. The dimension K is a dimension from the end of the TFT substrate to the end of the triangular hole portion 51 formed in the mold 5.

FIG. 2 is a sectional view along B-B of FIG. 1. As described with FIG. 1, the TFT substrate 1 and the color filter substrate 2 are laminated. On the TFT substrate 1, many pixels including pixel electrodes and TFTs for controlling signals to the pixel electrodes are arranged in a matrix form.

A liquid crystal is sealed between the TFT substrate 1 and the color filter substrate 2. The liquid crystal controls the light from the backlight with respect to each pixel according to the image signals supplied to the pixel electrodes, and thus, an image is formed. Since the liquid crystal can control only polarized light, the lower polarizer is attached to the undersurface of the TFT substrate 1 for polarizing the light from the backlight. The light controlled by the liquid crystal with respect to each pixel according to the image signals is polarized again by the upper polarizer provided on the upper surface of the color filter substrate 2, and the image is recognized by human eyes. A red, green, or blue filter is formed with respect to each pixel in the color filter substrate 2, and thereby, a color image is formed.

The liquid crystal display panel is mounted on the mold 5 with a light shielding double-faced tape 10. The mold 5 is provided with a step inside of a wall 56, and the light shielding double-faced tape 10 is attached to the step 57 and the light shielding double-faced tape 10 adheres to the liquid crystal display panel and fixes it. As shown in FIG. 2, the part where the liquid crystal display panel joins to the mold 5 via the light shielding double-faced tape 10 is a part of the TFT substrate 1 only. The part has a thickness of 0.25 mm and its strength is weak.

On the other hand, the part where the TFT substrate 1 and the color filter substrate 2 are bonded is 0.5 mm as a total of glass plates, and further, the upper polarizer 3 and the lower polarizer 4 are attached to the part and the strength of the polarizers is added thereto. The thicknesses of the upper polarizer 3 and the lower polarizer 4 are 0.12 mm, respectively. Therefore, the part has a total thickness of 0.75 mm or more including the thickness of adhesives, and its strength is much higher than the part of the TFT substrate 1 only. On this account, in the liquid crystal display panel, the stress tends to concentrate on the boundary portion between the part where the two of the TFT substrate 1 and the color filter substrate 2 are laminated and the part of the TFT substrate 1 only, and the portion often becomes a start point of the TFT substrate breakage.

In FIG. 2, the flexible wiring board 7 attached to the TFT substrate 1 is folded back to extend to the backside of the liquid crystal display panel and the backlight. A light emitting diode (LED 8) is attached to the flexible wiring board 7 as a light source of the backlight. On the flexible wiring board 7, wiring for supplying image signals from the host, power, etc. to the liquid crystal display panel and so on is formed.

The backlight is formed under the liquid crystal display panel. The backlight is held in the resin mold 5. In FIG. 2, the light from the LED 8 enters the side of a light guide plate 11. Although only one LED 8 is seen in FIG. 2, a plurality of LEDs 8 are actually provided along the side surface of the light guide plate 11. The function of the light guide plate 11 is to direct the light entering from the side surface of the light guide plate toward the liquid crystal display panel. The light guide plate 11 is generally formed of a transparent acrylic plate.

A reflecting sheet 12 is provided under the light guide plate 11. The light guide plate side of the reflecting sheet 12 is a mirror surface and has a function to reflect the light traveling downwardly from the light guide plate 11 and direct the light toward the liquid crystal display panel side. The reflecting sheet 12 is bonded to the undersurface of the mold 5, and also has a function to support and fix optical sheets such as the light guide plate within the mold. Further, the flexible wiring board 7 extends along the backside of the reflecting sheet 12.

A lower diffusing sheet 13 is provided on the light guide plate 11. The light source is the LED 8 and nearly a point light source, and thus, the light output from the light guide plate 11 toward the liquid crystal display panel side has irregularities in light intensity due to the reflection of the point light source. The function of the diffusing sheet is to turn the light from the light guide plate 11 into homogeneous light. The thickness of the lower diffusing sheet 13 is 0.04 mm, for example.

On the lower diffusing sheet 13, a lower prism sheet 14 and an upper prism sheet 15 are provided. The prism sheet is a sheet having one surface on which many prisms extending in one direction and having triangular sections are formed with a fine pitch. The pitch of the prisms is 0.05 mm, for example. The prism sheet has a function to improve the efficiency of the backlight by collecting the light toward the apexes of the triangles of the prisms to direct the light from the backlight toward the liquid crystal display panel.

The directions in which the prisms extend are nearly perpendicular in the lower prism sheet 14 and the upper prism sheet 15. For example, the lower prism directs the light traveling in the horizontal direction of the screen toward the liquid crystal display panel, and the upper prism sheet 15 directs the light traveling in the vertical direction of the screen toward the liquid crystal display panel. Thereby, the light from the backlight is efficiently directed toward the liquid crystal display panel. Both the lower prism sheet 14 and the upper prism sheet 15 have thicknesses of about 0.06 mm.

An upper diffusing sheet 16 is provided on the upper prism sheet 15. The principal function of the upper diffusing sheet 16 is to eliminate or reduce the moire generated between the prism sheet and the liquid crystal display panel. When the prism sheet is seen in the plan view, the parts around the apexes of the prisms are light and the parts around the valleys are dark. That is, light and dark fringes with a fine pitch are formed. On the other hand, on the TFT substrate 1, image signal lines are formed with a certain pitch in the vertical direction, and scan lines are formed with a certain pitch in the horizontal direction. Since these signal lines do not pass the backlight, there are the light pixel parts and the dark parts of the signal lines and so on with a fine pitch on the screen. Therefore, interference occurs between the prism sheet and the liquid crystal display panel and moire is generated.

The upper diffusing sheet 16 has a function to make the moire less noticeable by the haze effect. When the haze value of the upper diffusing sheet 16 is increased, the moire becomes less noticeable but the brightness of the screen becomes lower. By the upper diffusing sheet 16, the relationship between moire and brightness can be adjusted. The thickness of the upper diffusing sheet 16 is 0.06 mm, for example. In FIG. 2, no clearance is provided between the upper diffusing sheet 16 and the lower diffusing sheet, but actually, clearance is often provided.

The mold 5 holding the liquid crystal display panel and the backlight and the flexible wiring board 7 folded back to the backlight backside are housed within a frame (not shown) made of metal. The part of the flexible wiring board 7 folded back to the backside of the backlight is sandwiched between the backlight bottom and the frame. The frame is generally formed of stainless and has a thickness of about 0.3 mm.

Figure 3:
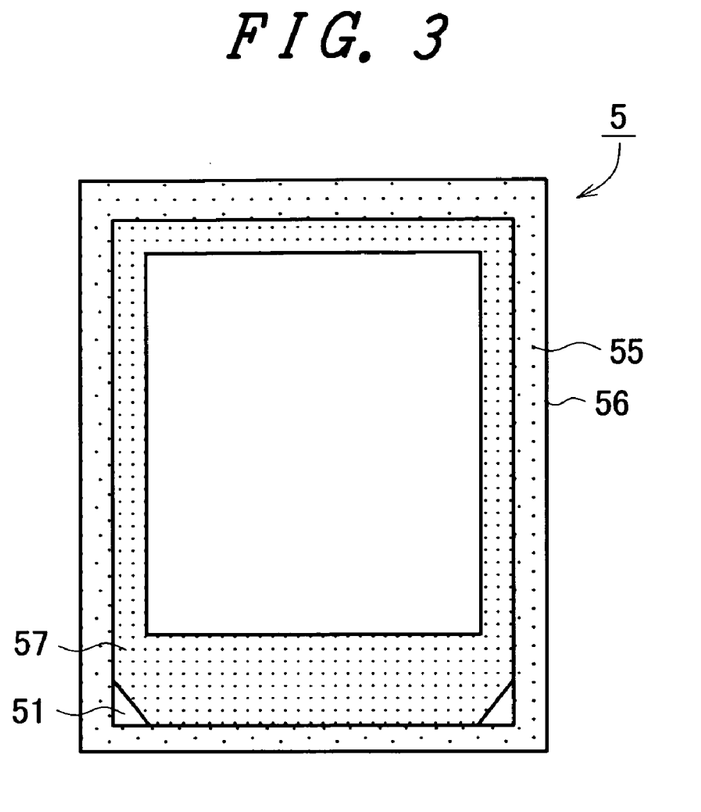
FIG. 3 is a plan view of a mold of embodiment 1.

FIG. 3 shows only the mold 5 of FIG. 1. The mold 5 has the step 57 formed inside surrounded by the outer frame. The light shielding double-faced tape 10 adheres to the step 57 and the liquid crystal display panel is bonded and fixed onto the light shielding double-faced tape 10. In the mold 5, the respective parts are fabricated extremely thin in order to make the outer size and the thickness of the liquid crystal display device small. Further, polycarbonate as a material of the mold 5 has great elasticity, and easily and elastically deforms due to an external force. Then, the problem of breakage of the TFT substrate 1 as described in Summary of the invention arises.

In order to solve the problem, in the embodiment, as shown in FIG. 3, the triangular hole 51 is provided in the corner of the step 57 of the mold 5 on which the liquid crystal display panel is to be mounted. Thereby, even when a force is applied from below to the mold 5 and the mold 5 deforms, the force can be prevented from application to the TFT substrate 1. It is necessary to form the triangular hole in the mold step portion 57 of the TFT substrate 1 only of the liquid crystal display panel. This is because the hole is for preventing the breakage of the part of the TFT substrate 1 only with weak glass strength.

Figure 4:
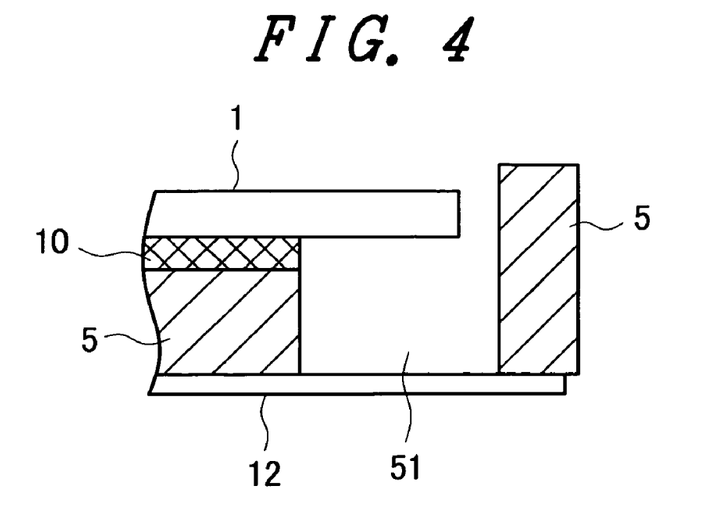
FIG. 4 is a sectional view along A-A of FIG. 1.

FIG. 4 is a sectional view along A-A of FIG. 1 showing the part where holes 51 are provided in the above described corners of the mold 5. In FIG. 4, the TFT substrate 1 is bonded to the mold 5 with the light shielding double-faced tape 10. The holes 51 are formed at the ends of the mold 5, and only the TFT substrate 1 is present above the holes 51. The lower parts of the holes 51 are closed by the reflecting sheet 12 so that a foreign material may not enter the holes from outside.

Figure 5:
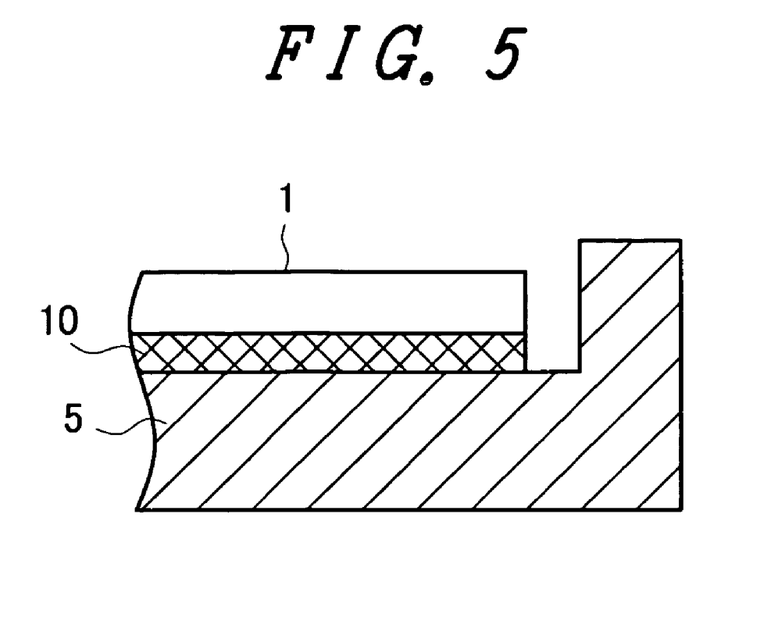
FIG. 5 is a sectional view showing a conventional example for comparison.

FIG. 5 shows a conventional example when there is no hole 51 in the corners of the mold 5 for comparison. The TFT substrate 1 including the ends is bonded to the mold 5 with the light shielding double-faced tape 10. In this case, when a force is applied to the mold 5 from below, the force is directly and externally applied to the TFT substrate 1 having a thin thickness of about 0.25 mm, and the risk of breakage of the TFT substrate 1 is significant.

Figure 6:
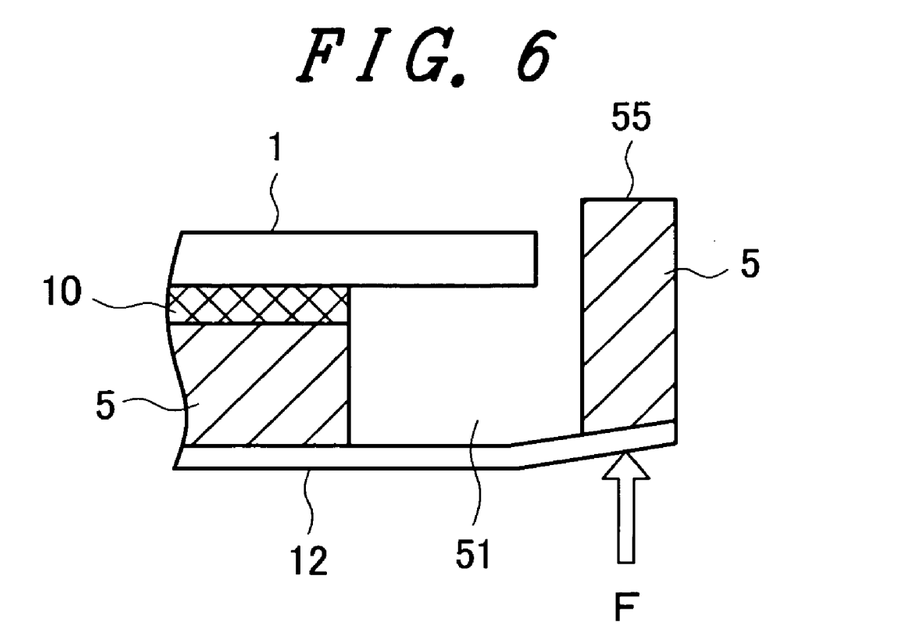
FIG. 6 is a sectional view showing an advantage of embodiment 1.

On the other hand, in the case of the invention shown in FIG. 4, when an external force F is applied to the mold 5 from below, the external force is not applied to the TFT substrate 1 because of the presence of the hole 51 in the mold 5, and the TFT substrate 1 is not broken. In FIG. 6, since the upper end 55 of the mold 5 is above the TFT substrate 1, when an external force is applied to the mold 5 from above, the external force is applied to the upper end 55 of the mold 5, and thus, the probability that the external force is directly applied to the TFT substrate 1 on the hole 51 is small. It is preferable that the light shielding double-faced tape 10 for bonding the TFT substrate 1 and the mold 5 in FIG. 4 does not reach the holes 51 of the mold 5.

FIG. 1 shows a shape of the holes 51 provided in the corners of the mold 5 in the plan view. The part where the greatest external force is applied to the TFT substrate 1 of the liquid crystal display panel is the part of E in FIG. 1, that is, the part changing from the laminated two glass substrates to the TFT substrate 1 only in the liquid crystal display panel. The stress applied to the part becomes maximum when an external force is applied to the corner end F of the TFT substrate 1. This is because the principle of leverage acts thereon. Therefore, it is necessary that at least holes 51 are formed in the corners of the TFT substrate 1.

The length K of the side along the long side of the liquid crystal display panel of the triangular hole 51 of the mold corner shown in FIG. 1 may be made longer to around the width L of the part of the TFT substrate 1 only. However, in this case, when some external force is applied to the TFT substrate 1 from above the liquid crystal display panel, the substrate is easily broken. In order to prevent the breakage, it is preferable that the length K of the side along the long side of the liquid crystal display panel is small. In view of the above facts, it is desirable that the length K is about L/3 to L. On the other hand, the length M of the side along the short side of the liquid crystal display panel of the triangular hole 51 of the mold corner shown in FIG. 1 may be equal to K or less. It is preferable that the length M is made so that the hole 51 of the mold 5 does not reach the position of the flexible wiring board 7. This is for preventing only one TFT substrate 1 from supporting the flexible wiring board 7.

Figure 7:
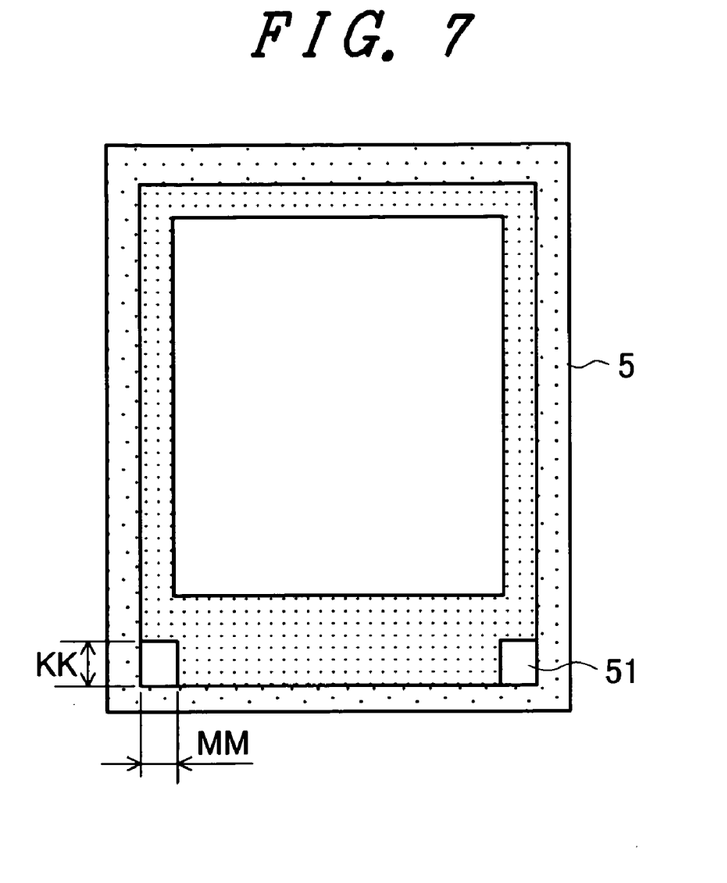
FIG. 7 is a plan view showing another form of the mold of embodiment 1.

Although the case where the holes 51 formed in the corners of the mold 5 are triangular has been described above, the shape of the hole 51 is not limited to triangle. For example, as shown in FIG. 7, the shape of the hole 51 maybe square or another. What is important is that the hole shape may prevent the direct transmission of the external force to the TFT substrate 1 in the mold corner. The long side KK and the short side MM of the square hole 51 in FIG. 7 may be determined for the same reason as described in the case of the triangular hole 51. That is, the long side KK may be set to have a dimension K in FIG. 1 when the liquid crystal display panel is incorporated in the mold 5, and the short side MM may be set to have a dimension M in FIG. 1 when the liquid crystal display panel is incorporated in the mold 5.

As described above, according to the embodiment, only by forming holes 51 in the corners of the conventional mold 5, the probability of breakage of the TFT substrate 1 when an external force is applied to the mold from below can be made lower, and the manufacture yield of the liquid crystal display device can be improved.

Embodiment 2

Figure 8:
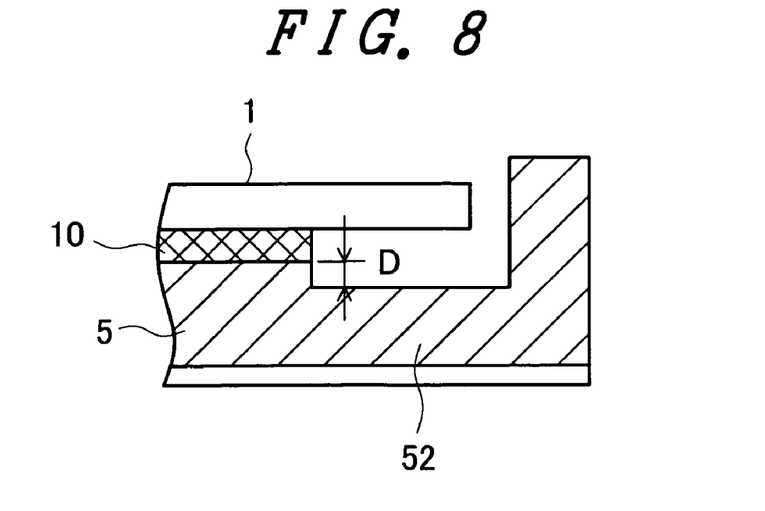
FIG. 8 is a sectional view showing a main part of embodiment 2.

FIG. 8 shows a main part of the second embodiment of the invention. FIG. 8 shows a section corresponding to the section along A-A of FIG. 1. In the embodiment 1, the holes 51 are formed in the corners of the mold 5 for preventing the application of the external force F to the TFT substrate 1 from below the mold 5, however, in this embodiment, recessed portions 52 are formed in the mold corners for obtaining the same effect.

The configuration of the recessed portion 52 as in FIG. 8 is more advantageous in that the reduction in strength of the mold 5 can be prevented compared to the case of the through hole 51. On the other hand, in order not to apply the external force from below the mold to the TFT substrate 1, it is necessary that the depth D of the recessed portion 52 in FIG. 8 is 0.1 mm or more. Further, in FIG. 8, it is preferable that the light shielding double-faced tape 10 does not reach the recessed portion 52.

Figure 9:
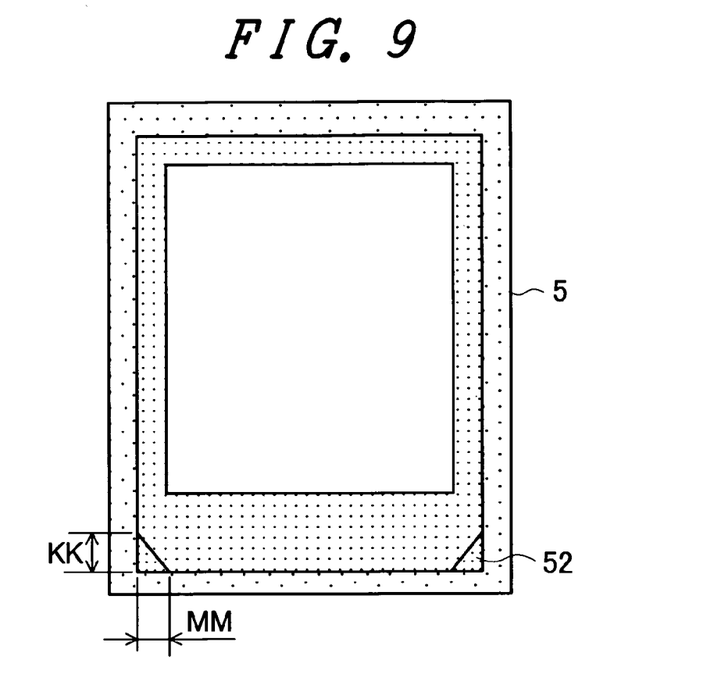
FIG. 9 is a plan view of a mold of embodiment 2.

FIG. 9 is a plan view of the mold 5 corresponding to the embodiment. In FIG. 9, triangular recessed portions 52 are formed in corners where the TFT substrate 1 only of the liquid crystal display panel is mounted. Regarding the dimensions of the triangle, the dimension KK and dimension MM in FIG. 9 may be determined by the method of determining the dimension K and dimension M in FIG. 1 described in the embodiment 1. That is, as shown in FIG. 1, the long side KK may be set to have the K dimension in FIG. 1 when the liquid crystal display panel is incorporated in the mold 5, and the short side MM may be set to have a dimension M in FIG. 1 when the liquid crystal display panel is incorporated in the mold 5.

Figure 10:
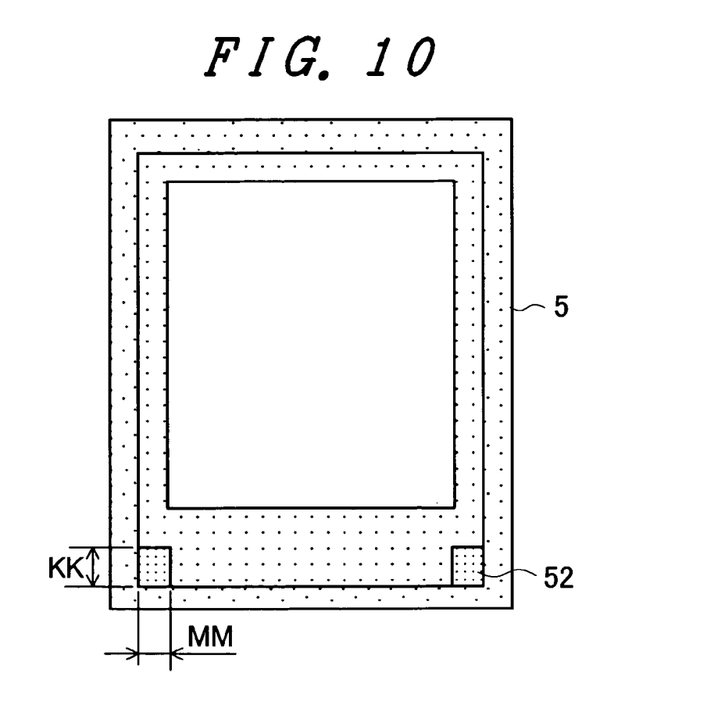
FIG. 10 is a plan view showing another form of the mold of embodiment 2.

The shape of the recessed portions 52 formed in the corners of the mold 5 is not necessarily limited to triangle. Any shape may be adopted as long as it relieves the external force from the lower part of the mold in the corners of the TFT substrate 1. FIG. 10 shows the case where the shapes of the mold corners are rectangular. The dimension KK and dimension MM of the rectangular recessed portions 52 in the corners in FIG. 10 can be determined using the method of determining the dimension K and dimension M in FIG. 1.

As described above, according to the embodiment, without reduction in strength of the mold 5, breakage of the TFT substrate 1 due to the external force from below the mold can be prevented and the reliability of products and the yield in the manufacturing process can be improved.

The invention claimed is:

1. A liquid crystal display device comprising:
a liquid crystal display panel having a TFT substrate on which pixel electrodes and TFTs for controlling signals to the image electrodes are arranged in a matrix form and a liquid crystal display panel having a color filter substrate on which color filters corresponding to the pixel electrodes are formed; and
a mold on which the liquid crystal display panel is mounted,
wherein the liquid crystal display panel includes a part where the TFT substrate and the color filter substrate are laminated and a part of the TFT substrate only, and
a hole is formed in a corner of the mold where the part of the TFT substrate only is mounted.

2. The liquid crystal display device according to claim 1, wherein the hole formed in the mold corner is triangular.

3. The liquid crystal display device according to claim 1, wherein the hole formed in the mold corner is triangular, and a length K of the triangle along a long side of the liquid crystal display panel satisfies $L/3 \leq K \leq L$, where a width along the long side of the liquid crystal display panel of the part of the TFT substrate only is L.

4. The liquid crystal display device according to claim 1, wherein the TFT substrate is provided with a flexible wiring board, and
when the TFT substrate is mounted on the mold, the hole formed in the mold corner does not overlap with the flexible wiring board.

5. The liquid crystal display device according to claim 1, wherein the liquid crystal display panel is bonded to the mold with a light shielding double-faced tape, and
the light shielding double-faced tape is not provided in the hole.

6. The liquid crystal display device according to claim 1, wherein the TFT substrate is mounted within the mold, and a surface of the TFT substrate is located below an upper end of the mold.

7. The liquid crystal display device according to claim 1, wherein a side opposite to the TFT substrate of the hole formed in the mold is covered by a reflecting sheet.

8. A liquid crystal display device comprising:
a liquid crystal display panel having a TFT substrate on which pixel electrodes and TFTs for controlling signals to the image electrodes are arranged in a matrix form and a liquid crystal display panel having a color filter substrate on which color filters corresponding to the pixel electrodes are formed; and
a mold on which the liquid crystal display panel is mounted,
wherein the liquid crystal display panel includes a part where the TFT substrate and the color filter substrate are laminated and a part of the TFT substrate only, and
a recessed portion is formed in a corner of the mold where the part of the TFT substrate only is mounted, said recessed portion being triangular.

9. The liquid crystal display device according to claim 8, wherein a length K of the triangle, of the recess portion, along a long side of the liquid crystal display panel satisfies $L/3 \leq K \leq L$, where a width along the long side of the liquid crystal display panel of the part of the TFT substrate only is L.

10. The liquid crystal display device according to claim 8, wherein the TFT substrate is mounted within the mold, and a surface of the TFT substrate is located below an upper end of the mold.

11. A liquid crystal display device comprising:
a liquid crystal display panel having a TFT substrate on which pixel electrodes and TFTs for controlling signals to the image electrodes are arranged in a matrix form and a liquid crystal display panel having a color flier substrate on which color filters corresponding to the pixel electrodes are formed, wherein the TFT substrate is provided with a flexible wiring board,
a mold on which the liquid crystal display panel is mounted, wherein the liquid crystal display panel includes a part where the TFT substrate and the color filter substrate are laminated and a part of the TFT substrate only, and
a recessed portion is formed in a corner of the mold where the part of the TFT substrate only is mounted,
wherein when the TFT substrate is mounted on the mold, the recessed portion formed in the mold corner does not overlap with the flexible wiring board.

12. A liquid crystal display device comprising:
a liquid crystal display panel having a TFT substrate on which pixel electrodes and TFTs for controlling signals to the image electrodes are arranged in a matrix form and a liquid crystal display panel having a color filter substrate on which color filters corresponding to the pixel electrodes are formed,
a mold on which the liquid crystal display panel is mounted, wherein the liquid crystal display panel includes a part where the TFT substrate and the color filter substrate are laminated and a part of the TFT substrate only, and
a recessed portion is formed in a corner of the mold where the part of the TFT substrate only is mounted,
wherein the liquid crystal display panel is bonded to the mold with a light shielding double-faced tape, and
the light shielding double-faced tape is not provided in the recessed portion.

* * * * *